United States Patent [19]

Blumenkopf et al.

[11] Patent Number: 5,051,196

[45] Date of Patent: Sep. 24, 1991

[54] SOFTENING COMPOSITIONS AND METHODS FOR MAKING AND USING SAME

[75] Inventors: Norman Blumenkopf, Fort Lee, N.J.; Jean-Paul Grandmaire, Andrimont, Belgium; Alain Jacques, Blegny, Belgium; Viviane Tack, Soumagne, Belgium

[73] Assignee: Colgate-Palmolive Co., Piscataway, N.J.

[21] Appl. No.: 469,807

[22] Filed: Jan. 22, 1990

Related U.S. Application Data

[63] Continuation of Ser. No. 232,346, Aug. 12, 1988, abandoned.

[51] Int. Cl.[5] ..................... D06M 13/38; C08G 77/44

[52] U.S. Cl. ..................................... 252/8.8; 8/115.6; 252/8.6; 252/8.9

[58] Field of Search ................................. 252/8.8, 8.9

[56] References Cited

U.S. PATENT DOCUMENTS 4,126,562 11/1978 Goffimet et al. .................... 252/8.8

4,128,484 12/1978 Barford et al. ....................... 252/8.8

FOREIGN PATENT DOCUMENTS 169500 1/1986 European Pat. Off. .

OTHER PUBLICATIONS

Dow Corning, "Cross-Linking Test for OCF2-1597 to Verify Cross-Linking Structure".

Walter Noll, "Chemistry and Technology of Silicones", Academic Press, New York, pp. 1-9 and 282-287, 1968.

*Primary Examiner*—A. Lionel Clingman

*Attorney, Agent, or Firm*—Bernard Lieberman; Murray M. Grill; Robert C. Sullivan

[57] ABSTRACT

Stable pourable aqueous fabric softening compositions based on quaternary ammonium softeners and siloxanes are provided. The softening component comprises from about 1-20% by weight of the composition. Methods for making the composition are also described. Softening performance is superior to that obtained by using quaternary ammonium compound softeners, alone or with other components absent the siloxane. The softener compositions are primarily intended for use in the rinse cycle of an automatic washing machine.

7 Claims, No Drawings

SOFTENING COMPOSITIONS AND METHODS FOR MAKING AND USING SAME

This is a continuation of application Ser. No. 232,346,filed Aug. 12, 1988, now abandoned.

The invention relates to fabric softening compositions adapted to be used in the rinse cycle of an automatic dishwashing machine. More particularly, this invention is concerned with aqueous fabric softening compositions which impart improved softness and other desirable attributes such as better rewettability to the compositions. Specifically, the invention is based on the combination of a cationic softener and a unique class of polysiloxanes.

Compositions containing quaternary ammonium salts having at least one long chain hydrocarboxyl group such as distearyl dimethyl ammonium chloride or long-chain imidazolinium salts are commonly used to provide fabric softening benefits when employed in a laundry rinse operation; for example, see U.S. Pat. Nos. 3,349,033; 3,644,203; 3,946,115; 3,997,453; 4,073,735; and 4,119,545, among many others.

The quaternary ammonium compounds, while they are salts, are nevertheless generally characterized as water-insoluble since their solubility in water under normal conditions is less than about 5% by weight. The usual concentration used by the consumer and accepted as the "standard" is 6% by weight. At this and higher concentrations these cationic salts are generally present as "sols" or dispersions, and stability becomes a major problem. See for example U.S. Pat. No. 4,426,299 col. 1, lines 11 to 22. As a matter of fact stability and viscosity problems become major ones at higher concentrations e.g. above about 7% by weight of the cationic. There have been many proclaimed solutions to providing concentrated (i.e.>6–7%) stable cationic formulations within usable and consumer acceptable viscosity ranges e.g. 30 cps to 500 cps. See for example U.S. Pat. Nos. 4,442,013 and 4,661,270. While such concentrated formulations may afford stable and acceptable viscosity products their softening characteristics of course at equivalent concentrations, are essentially the same as the 6–7% products.

It is desirable to provide cationic softening compositions, particularly for use in the rinse cycle of a clothes washing machine, which are of improved softening not only at equal concentrations with older formulations, but even at lower concentrations. This concept is not new as evidenced e.g. by U.S. Pat. No. 4,000,077 to Wixon wherein cationic quaternary softener is combined with alcohol or alcohol ether sulfate. This patent also demonstrates that with improved softening, another plus is achieved in terms of enhanced whiteness, the latter often being adversely affected by cationics.

It has also been known to employ silicone-based composition for treating fibers or yarns and textiles to soften them. See, in this regard, an article in Colorage—June 29, 1972 entitled "Silicones in the Textile Industry" by M. J. Pald p 46 and 53. Also attention is directed to U.S. Pat. Nos. 3,968,042 and 4,020,212 wherein compositions of organo polysiloxane (and predominantly a poly [dimethyl siloxane]) with a cationic softening surfactant (e.g. distearyl dimethyl ammonium chloride) or conventional imidazolinium softener (Varisoft 475) are described for the treatment of polyolefin fibers. The organo polysiloxanes are liquid, water-dispersible products with viscosities ranging from "about 100 to about 400" cps at 77° F. (25° C.).

In British 1,549,180, combinations of cationic and silicone are described, with the silicone providing in addition to some of the previously known benefits as waterproofing agent and "ironing aids" anti-stat, soil release etc. . . , softening benefits as well. The silicones are siloxanes with viscosities at 25° C. of "at least 100 centistokes and up to 8000 centistokes". While this patent appears limited to siloxanes with viscosities not above 8000 centistokes disclosures of higher viscosities (e.g. up to 170000 centistokes) are given but data is given allegedly establishing optimum performance in the range of 3000 to 8000 cs. (Ex. I). In other foreign patents corresponding to British, 1549180, such as French, 2318268, there is generally a similar disclosure but in addition additional examples are given (see also Canadian 1085563, 1102511 and 1118965) indicating "high viscosity silicones may give superior softeners".

Further reference is made to U.S. Pat. No. 3,376,161 which discloses compositions of quaternary ammonium salts and polysiloxanes for impregnating fibrous material to impart "anti-scuff" characteristics. The only specific viscosity given for a polysiloxane is 10,000 cs at 25° C. None of the prior art especially in the laundry softener field discloses a cross-linked polysiloxane.

It has now been discovered that improved softening compositions are provided by a combination of a cationic softener or mixture of cationic softeners or mixtures of cationics with anionics (e.g. alcohol sulfates or alcohol ether sulfates) and/or non-ionics (e.g. fatty alcohols, fatty acid esters), and the like, with a cross-linked polysiloxane. The polysiloxane may be liquids, semi-solids or solids. The liquids may have viscosities in the range of less than about 100 to several hundred to several thousand to the tens of thousands and up to where it becomes unmeasurable; the preferred polysiloxanes have viscosities about 10,000 cs (25° C.) up to elastomeric types (i.e. no measurable viscosity).

The compositions of this invention not only give superior softening, but quite unexpectedly yield treated textiles with improved rewettability.

As is well known, the cationic softeners tend to provide fabrics with a degree of water-resistance or in other words these softeners tend to render the fabric somewhat hydrophobic. Silicones (or polysiloxanes) also would be expected to increase the hydrophobicity of fabrics treated with them as described in British 1,549,180. Notwithstanding such teachings and expectations it has now been discovered that the compositions of this invention not only provide improved and outstanding softening of textiles especially in the rinse cycle of a washing machine but also do so without increasing the hydrophobicity of the textile. As a matter of fact the goods exhibit improved wettability. As most are aware, one of the ubiquitous complaints of cationic softeners is that, in particular, towels softened with such softeners do not absorb water as well as virgin or untreated towels. This is also a complaint with synthetics where the comfort factor is often directly related to the ability to absorb moisture. Thus as an example, nylon goods tend to be uncomfortable in warm climates due to their lower ability to absorb perspiration than cotton. Softening these synthetics with cationics exacerbates this problem.

The cationics which are useful herein include the entire class of quaternary ammonium compounds which may, only in part, be represented by the following general formulas.

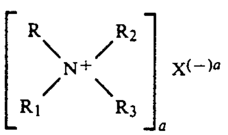
I wherein at least one of the R groups and preferably two (e.g. R and $R_1$) represents an aliphatic from 12 to 30 carbon atoms and the other R groups (e.g. $R_2$ and $R_3$) may be lower aliphatic e.g. from $C_1$ to $C_8$ preferably $C_1$ to $C_4$ and preferably, alkyl or aralkyl as methyl, ethyl and propyl or benzyl. The "other" R groups (i.e. $R_2$ and $R_3$) may also together with the nitrogen and/or one or more other heteroatoms and (preferably nitrogen) form a 5- or 6-membered heterocyclic ring and $X^-$ is any anion e.g. halo, sulfate, methyl sulfate, nitrate, acetate, phosphate, benzoate, oleate, etc. The symbol "a" represents the ionic valance of the anion and also, therefore, the number of quaternary cationic moieties in association therewith. Thusly with a sulfate anion we would have

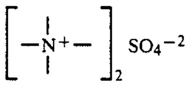

Typical compounds of the foregoing formula I include ethyl-dimethyl-stearyl ammonium chloride, cetyl-dimethyl-benzyl ammonium chloride, dimethyl distearyl ammonium chloride, benzyl-dimethyl-stearyl ammonium chloride, benzyl-dimethyl-stearyl ammonium bromide, trimethyl-stearyl ammonium chloride, trimethyl-cetyl ammonium bromide, diethyldistearyl ammonium chloride, diethyl-octyl-stearyl ammonium chloride, dimethyl-ethyl-lauryl ammonium chloride, dimethyl-methylethyl-lauryl-cetyl ammonium chloride, propyl myristyl ammonium chloride, ditallow-dimethyl ammonium chloride, and the corresponding methosulfates, acetates, etc. Imidazolinium compounds of the formula;

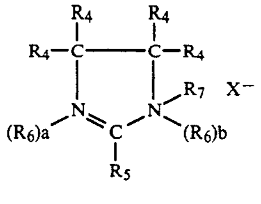
II wherein the $R_4$ groups represent independently hydrogen or $C_1$ to $C_4$ alkyl with hydrogen being preferred; $R_5$ represents aliphatic, preferably alkyl or acyloxyalkyl of $C_8$ to $C_{30}$ and more preferably alkyl of $C_{13}$ to $C_{22}$; $R_6$ represents aliphatic, preferably $C_1$ to $C_4$ alkyl and more preferably methyl or ethyl; a and b represent zero or one and a+b=1; $R_7$ may be selected as $R_5$, the same or different, or may be lower alkyl or substituted alkyl of $C_1$ to $C_4$ such as haloalkyl, hydroxyalkyl, aminoalkyl, alkylaminoalkyl, acylaminoalkyl and the like; and $X^-$ is any anion similar to the formula I quaternary anions; the more preferred compounds of formula II are the acylaminoethyl compounds of the formula

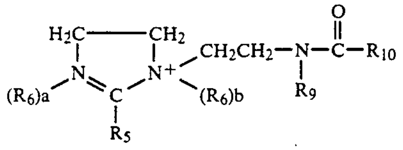
II(a)

where $R_5$, $R_6$, (a) and (b) are as defined for Formula II and $R_9$ is hydrogen or selected from the same group as $R_5$, and $R_{10}$ is hydroxyl (whence the free acid) or alkyl of $C_1$ to $C_4$.

Illustrative compounds of Formulas II and IIa include;

2-heptadecyl-1-methyl-1-oleylamidoethyl imidazolinium ethosulfate 2-heptadecyl-1-methyl-1-(2-stearoylamido)ethylimidazolinium sulfate, 2-heptadecyl-1-methyl-1-(2-stearoylamido)ethylimidazolium chloride, 2-coco-1-(2-hydroxyethyl)-1-benzyl imidazolonium chloride, 2-coco-1-(hydroxyethyl)-1-(4-chlorobutyl)-imidazolinium chloride, 2-coco-1-(2-hydroxyethyl)-1-octadecenyl imidazolinium chloride 2-tall oil fatty-1-(2-hydroxyethyl)-1-benzyl imidazolinium chloride, 2-tall oil fatty-1-(2-hydroxyethyl)-1-(4-chlorobutyl-)imidazolinium chloride, 2-heptadecenyl-1-(2-hydroxyethyl)-1-(4-chlorobutyl-)imidazolinium chloride, 2-heptadecenyl-1-(2-hydroxyethyl)-1-benzyl imidazolinium chloride, 2-heptadecyl-1-(hydroxyethyl)-1-octadecyl imidazolinium ethyl sulfate, Polycationics of the following formula III are also useful:

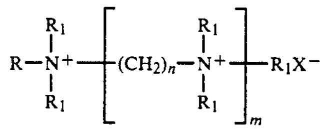
III wherein the R group is selected from $C_{10}$ to $C_{30}$ aliphatic, preferably alkyl or alkenyl; or RO-$(CH_2)_n$- where R has same meaning as above, i.e. $C_{10}$ to $C_{30}$ aliphatic and preferably alkyl or alkenyl; the $R_1$'s may be hydrogen; $C_1$ to $C_4$ alkyl or hydroxyalkyl groups; n is an integer of 2 to 6 and m is an integer from 1 to 5; and X is as defined in Formula (A). The preferred compounds are those where R is $C_{12}$ to $C_{18}$ and $R_1$ is lower alkyl, especially methyl.

Of the compounds within formula III mention may be made of the following

N-Tallowyl-N,N,N$^1$,N$^1$-tetramethyl-1,3-propanediammonium dimethosulfate

N-Tallowyl-N,N$^1$,N$^1$-trimethyl-1,3-propanediammonium dimethosulfate

N-Oleyl-N,N,N$^1$,N$^1$,N$^1$-pentamethyl-1,3-propanediammonium dimethosulfate

N-Tallowyl-N,N,N$^1$,N$^1$,N$^1$-pentamethyl-1,3-propanediammonium dimethosulfate N-stearyl-N,N,N$^1$,N$^1$,N$^1$-pentamethyl-1,3-propanediammonium dimethosulfate N-stearyloxypropyl-N,$N^1$,$N^1$tris(3-hydroxypropyl)-1,3-propanediammonium dimethosulfate The cross-linked polysiloxanes which may be used are generally represented by a reticulated structure comprising the following units:

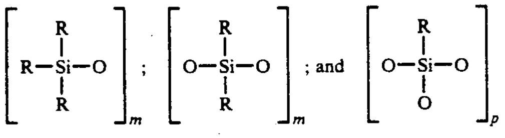

"M" unit "D" unit "T" unit wherein R represents alkyl, particularly lower ($C_1$ to $C_4$ alkyl), substituted alkyl (e.g. with alkoxy, amino, halogen etc. . . . ), aralkyl (e.g. benzyl) and the like; the preferred R group is methyl, the "M" unit comprises from 0 to about 10% (e.g. 0%, 2%, 5%) of the number of units. The "D" unit from about 20 to about 95% of the number of units and the "T" unit from about 2 to about 80%. Preferred ranges are 0 to 5% for "M" units; about 40% to about 80% "D" units; and about 10% to about 60% "T" units. Most preferred are ranges of 0% to less than 5% (e.g. 1%, 2% or 3%) of "M" units; 60 to 80% "D" units; and about 20% to about 40% "T" units. m, n, and p represent integers expressing the relative content of the "M", "D" and "T" units respectively. Expressed as a ratio where "M" units are present, we have $\frac{n+p}{m}$ - may range from about 100:1 to 10:1 and preferably about 100:1 to 20;1, with no "M" units the ratio is $\frac{n}{p}$ - may range from about 49:1 to 1:4 and preferably about 4:1 to1:1.5

The compositions of this invention are readily prepared in the usual 6–8% active ingredient level which is the customary one for the reasons advanced above. It is quite apparent that higher levels may be used resorting to the techniques of the prior art and, as demonstrated earlier, levels up to 60% by weight of active ingredients are readily obtained. Regardless, however, of the level of active ingredients, of more significance in achieving the maximum benefits of this invention is the ratio of cationic softener to polysiloxane. Ratios of cationic to polysiloxane may range from about 100:1 to about 1:10 with ratio from about 15:1 to 1:10 being preferred; 7:1 to 1:7 more preferred, 5:1 to 1:5 more highly preferred with outstanding results achievable at ratios of 5:1, 2:1, 1:1, 1:2 and 1:5.

As for viscosity preferences the range of from about 10,000 up to about 100,000 (e.g. 60,000 cps) is outstanding for softening, but also, up to and above 1,000,000 cps is equally useful. Of unique significance are the elastomeric products which have, one might say, infinite viscosity. They are not only outstanding softeners but also impart rewettability characteristics which are even better than those given by the lower viscosity materials.

In addition to the cationic softener and polysiloxane, one may add, as well, an alcohol sulfate (e.g. softener adjuvants or otherwise for example, $C_{16}$ to $C_{18}$ alcohol sulfate), an alcohol ether sulfate (e.g. $C_{16}$ to $C_{18}$ alcohol and 2 or 3 or 4 moles of ethylene oxide and then sulfated), sodium paraffin (e.g. $C_{16}$ to $C_{18}$) sulfonate, nonionic material such as paraffins, fatty acid ester glycol and glyceryl esters, a fatty alcohol e.g. $C_{16}$ to $C_{18}$ alcohol; an ethoxylated fatty, amine salt of a higher ($C_{16}$ to $C_{20}$—e.g. stearic) fatty acid and so forth. These auxiliary materials may be present in a cationic to auxiliary ratio of about 20:1 to 1:5 preferably from about 15:1 to 1:1 and more preferably 10:1 to 3:1. The composition may contain the usual adjuvants of perfume, color opacifiers (e.g. resin emulsions), sequestrant, viscosity control agents such as inorganic salts i.e. sodium nitrate, sodium chloride, calcium chloride and the like, solubilizers e.g. hydrotropes, etc. . . .

A particularly preferred additional component is represented by the general class of high molecular weight alcohols and especially the fatty alcohols of $C_8$ to $C_{30}$, typically $C_{12}$ to $C_{20}$ such as n-dodecyl alcohol, n-tetradecylalcohol, oxo-tridecylalcohol, n-hexadecylalcohol, n-octadecyl alcohol, eicosyl alcohol, and mixed fatty alcohols of synthetic or natural derivation e.g. stearyl alcohol. An especially preferred ratio of cationic to fatty alcohol ranges from 6:1 to 2:1 and more preferred 5:1 to 3:1 and most preferred 4.5:1 to 3.5:1 (e.g. 4:1).

The following example will serve to illustrate the present invention without being deemed limitative thereof. Parts are by weight unless otherwise indicated.

EXAMPLE I

A softening composition of the following components is provided

| | % |
|---|---|
| Ditallow dimethyl ammonium chloride | 3.6 |
| $C_{16}$-$C_{18}$ fatty alcohol | 0.9 |
| Siloxane (cross-linked X2-7589) | 0.5 |

This product when compared to a 180 cps substantially linear poly siloxane yields drastically softer terry cloth towels and improved rewettability in the towels. The softening evaluation tests may be run according to a conventional laboratory procedure using six times hardened cotton terry cloth towels at a dosage of 110 ml/wash with 8 replicates or in a standard washing machine with terry cloth towels. The rewettability is determined by partially immersing thin, treated strips of cloth into a column of water and measuring the wicking height of the liquid.

EXAMPLE II

Example I is repeated using the following cationics and amounts thereof in place of the DTDMAC (3.6%)

| | % |
|---|---|
| (a) DTDMAC | (4.0%) |
| (b) DTDMAC | (3.2%) |
| (c) Dimethyl distearyl ammonium methosulfate | (3.6%) |
| (d) 2-heptodecyl-1-methyl-1-olylamidoethyl imidazolinium ethosulfate | (3.6%) |

EXAMPLE II

Each of Examples I and II(a) to II(e) is repeated replacing the mixed $C_{16}$-$C_{18}$ fatty alcohol with the following non-ionics in the indicated amounts

| | % |
|---|---|
| (a) hexadecyl alcohol | (0.9%) |
| (b) octadecyl alcohol | (0.9%) |
| (c) glyceryl monostearate | (0.9%) |
| (d) $C_{16}$-$C_{18}$ fatty alcohol | (1.2%) |

EXAMPLE IV

A composition similar to Example I is prepared except that in place of X2-7589 cross-linked polysiloxane an equal amount of a linear (VP1445E-Walker Chemical Co.) polydimethyl-siloxane is used. While this particular composition softens well, its rewettability is significantly poorer than that of Example I. In the wicking test, Example I test sample gives a wicking height of 44.8 mm whereas in this example the test sample goes only 35.4 mm. A difference of 3.5 mm in test results is considered significant.

EXAMPLE V

Example I and II are repeated except that the fatty alcohol is eliminated and in the case of Example II(a) and II(b) the level of cationic is raised 30%. Excellent results are obtained.

What we claim is:

1. A fabric softening composition comprising
(A) a quaternary ammonium salt fabric softening compound, and
(B) a cross-linked polysiloxane represented by a structure containing the following difunctional units D and tri-functional units T; and, optionally, monofunctional units, M:

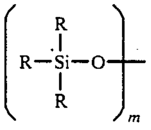

(M unit)

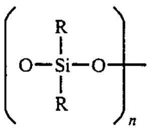

(D unit)

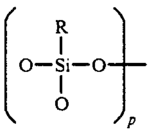

(T unit)

where
R represents alkyl of from 1 to 4 carbon atoms, which may be substituted, or benzyl,
m, n and p are numbers expressing the relative content of the "M", "D" and "T" units, respectively, and (n+p)/m ranges from 100:1 to 10:1 when optional units "M" are present and n/p ranges from 49:1 to 1:4 when optional units "M" are not present, the amount of the tri-functional cross-linking units "T" ranges from about 2 to 80% of the total units, the amount of di-functional units "D" is from about 20 to about 95% of the total units, and the amount of units "M" ranges from 0 to about 5% of the total units, and the weight ratio of (A) to (B) ranges from about 100:1 to 1:10.

2. A fabric softening composition as defined in claim 1 further comprising a nonionic softener adjuvant selected from the group consisting of paraffins, fatty acid ester glycol, glycerol esters, fatty ($C_8$ to $C_{30}$) alcohol, and ethoxylated amine salt of a higher ($C_{16}$-$C_{20}$) fatty acid.

3. A fabric softening composition as defined in claim 1 wherein the ratio of (A) to (B) ranges from about 5:1 to 1:1.

4. A fabric softening composition as defined in claim 2 wherein the ratio of (A) to (B) ranges from about 5:1 to 1:1.

5. A fabric softening composition as defined in claim 4 wherein the quaternary ammonium salt is represented by the formula:

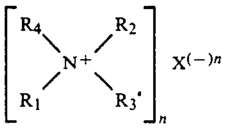

(a)

wherein $R_4$ represents a $C_{12}$ to $C_{30}$ alkyl moiety, $R^1$ represents a $C_{12}$ to $C_{30}$ alkyl moiety, lower alkyl of $C_1$ to $C_4$ or benzyl, $R_2$ and $R_3$ independently represent lower alkyl of $C_1$ to $C_4$ or benzyl; or $R_2$ and $R_3$ together with the nitrogen atom to which they are bonded form a 5- or 6-membered heterocyclic ring, $X^-$ is an anion, and n represents the valence of the anion $X^-$.

6. A fabric softening composition comprising a quaternary ammonium salt fabric softening compound (Q), a cross-linked polysiloxane (S) represented by a structure containing the following di-functional units D and tri-functional units T; and, optionally, monofunctional units, M:

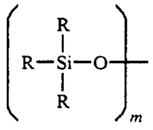

(M unit)

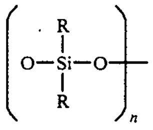

(D unit)

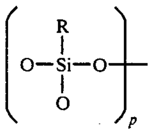

(T unit)

where
R represents alkyl of from 1 to 4 carbon atoms, which may be substituted, or benzyl,
m, n and p are numbers expressing the relative content of the "M", "D" and "T" units, respectively, and (n+p)/m ranges from 100:1 to 10:1 when optional units "M" are present and n/p ranges from 49:1 to 1:4 when optional units "M" are not present, the amount of the tri-functional cross-linking units "T" ranges from about 2 to 80% of the total units, the amount of di-functional units "D" is from about 20 to about 95% of the total units, and the amount of units "M" ranges from 0 to about 5% of the total units, and a non-ionic softener enhancer (E) selected from the group consisting of paraffins, fatty acid ester glycol, glycerol esters, fatty ($C_8$ to $C_{30}$) alcohol, and ethoxylated amine salt of a higher ($C_{16}$–$C_{20}$) fatty acid in a weight ratio of Q:S:E ranging from 100:1:5 to 1:10:1.

7. A method for treating laundry to soften the laundry in the rinse cycle of a clothes washing machine which comprises adding to the rinse cycle water a fabric softening composition as defined in claim 1.

* * * * *